(12) United States Patent
Wang

(10) Patent No.: US 8,717,722 B2
(45) Date of Patent: *May 6, 2014

(54) PROTECTION CIRCUIT AND ELECTRONIC DEVICE USING THE SAME

(75) Inventor: Tao Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 413 days.

This patent is subject to a terminal disclaimer.

(21) Appl. No.: 13/090,154

(22) Filed: Apr. 19, 2011

(65) Prior Publication Data

US 2011/0261488 A1   Oct. 27, 2011

(30) Foreign Application Priority Data

Apr. 26, 2010   (CN) .......................... 201010155808.9

(51) Int. Cl.
*H02H 9/00* (2006.01)
(52) U.S. Cl.
USPC .......................................... 361/52

(58) Field of Classification Search
USPC ................................... 361/56, 52
See application file for complete search history.

(56) References Cited

U.S. PATENT DOCUMENTS

| 5,359,281 | A  | * | 10/1994 | Barrow et al. ............... 323/284 |
| 5,633,573 | A  | * | 5/1997  | van Phuoc et al. ............ 320/128 |
| 6,448,833 | B2 |   | 9/2002  | Hirose |
| 8,370,565 | B2 | * | 2/2013  | Hung ............................. 711/103 |

* cited by examiner

*Primary Examiner* — Stephen W Jackson
(74) *Attorney, Agent, or Firm* — Novak Druce Connolly Bove + Quigg LLP

(57) ABSTRACT

A protection circuit includes a control unit, a switch unit, a storage unit, and a delay unit, and the protection circuit is used for protecting a processing unit. The control unit is used for receiving a control signal from the processing unit when the processing unit has completed initialization, and generating a pulse voltage. The switch unit is respectively turned on and cut off when the pulse voltage is at a first and second voltage level. The storage unit receives a second supply voltage from the power source and stores energy when the switch unit is turned on, and releases energy to generate a third supply voltage when the switch unit is cut off. The delay unit delays the pulse voltage for a predetermined time period, wherein the third supply voltage is provided to the primary module.

19 Claims, 2 Drawing Sheets

PROTECTION CIRCUIT AND ELECTRONIC DEVICE USING THE SAME

BACKGROUND

1. Technical Field

The disclosed embodiments relate to protection circuits, and more particularly to a protection circuit and an electronic device.

2. Description of Related Art

Generally, an electronic device includes a processing unit with an initialization pin. When a power source starts to provide a first supply voltage to the processing unit, the initialization pin is activated at the same time, thus the processing unit is initialized. When the processing unit has completed initialization, a second supply voltage from the power source is provided to the processing unit, and the processing unit starts to work.

However, when the power source starts to provide the first supply voltage, the initialization pin sometimes receives noise due to electrostatic discharge (ESD) etc, and the initialization time period of the processing unit may be cut short. After the processing unit has mistakenly ended initialization, the second supply voltage from the power source is supplied to the processing unit, thus the processing unit may malfunction.

What is needed, therefore, is a protection circuit and an electronic device to overcome the above described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout two views.

DETAILED DESCRIPTION

Figure 1:
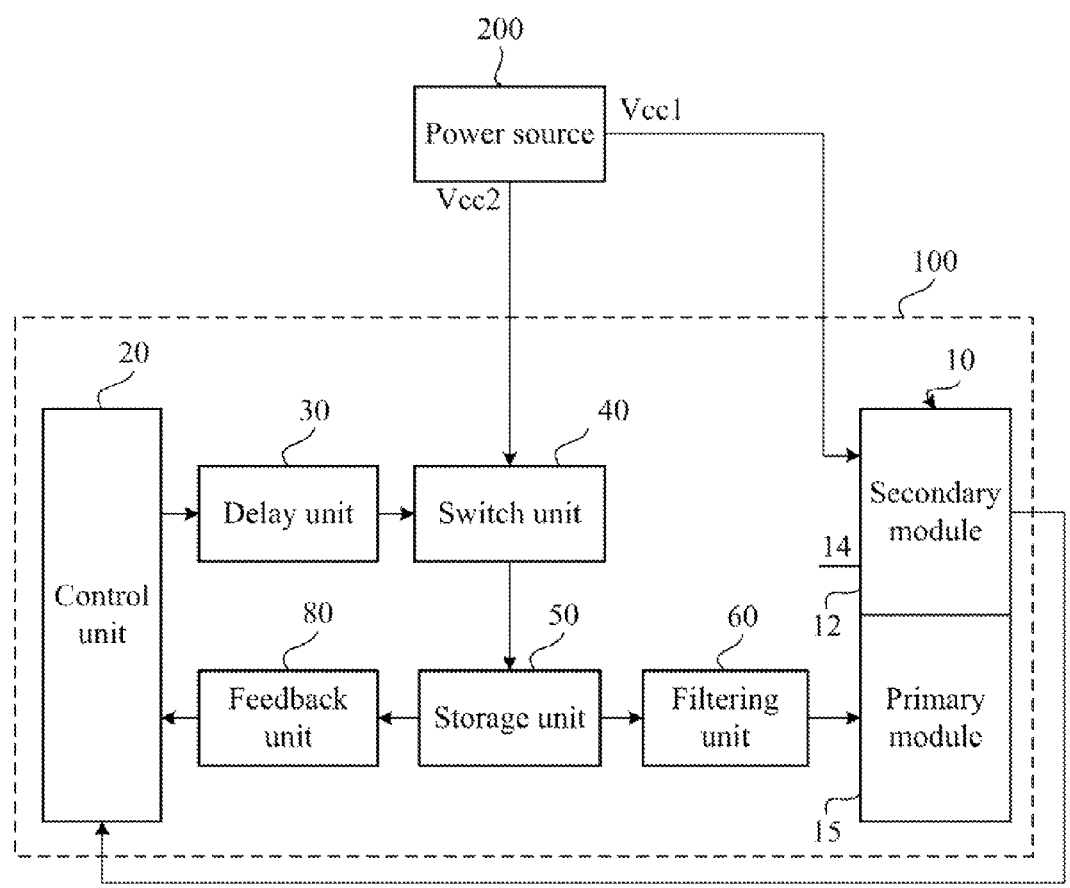
FIG. 1 is a block diagram of an electronic device in accordance with one embodiment.

Referring to FIG. 1, an electronic device 100 includes a processing unit 10, a control unit 20, a delay unit 30, a switch unit 40, a storage unit 50, a filtering unit 60, and a feedback unit 80. The electronic device 100 receives a first supply voltage Vcc1 and a second supply voltage Vcc2 from a power source 200.

The processing unit 10 includes a secondary module 12, an initialization pin 14, and a primary module 15. When the power source 200 starts to provide the first supply voltage Vcc1 to the secondary module 12, the initialization pin 14 is activated at the same time, therefore the processing unit 10 is initialized and generates a control signal when initialization has been completed. The secondary module 12 is used for detecting an initialization time period of the processing unit 10, comparing the initialization time period with a threshold time period, reactivating the initialization pin 14 when the initialization time period is shorter than the threshold time period.

The control unit 20 is used for generating a pulse voltage in response to the control signal.

The delay unit 30 is used for delaying the pulse voltage for a predetermined time period.

The switch unit 40 is used for receiving the delayed pulse voltage, and is turned on when the pulse voltage is at a first voltage level and is cut off when the pulse voltage is at a second voltage level. In this embodiment, the first voltage level is a low voltage level, and the second voltage level is a high voltage level.

The storage unit 50 is used for receiving the second supply voltage Vcc2 and storing energy when the switch unit 40 is turned on, and releasing energy to generate a third supply voltage when the switch unit 40 is cut off.

The filtering unit 60 is used for filtering the third supply voltage, and providing the filtered third supply voltage to the primary module 15. Even if the initialization time period of the processing unit 10 is cut short, because the pulse voltage is delayed before being provided to the switch unit 40 for the predetermined time period, the filtered third supply voltage is also delayed before being provided to the primary module 15 for the predetermined time period, therefore the primary module 15 is effectively protected. Further, during the predetermined time period, the initialization pin 14 is reactivated, and the processing unit 10 is initialized again, after the processing unit 10 has completed initialization, the primary module 15 can safely receive the filtered third supply voltage, and the processing unit 10 starts to work. In this embodiment, the threshold time period is shorter than the predetermined time period.

The feedback unit 80 is connected to the storage unit 50 and the control unit 20. The feedback unit 80 is used for receiving the third supply voltage from the storage unit 50, sampling the third supply voltage, and generating a feedback signal. The control unit 20 adjusts a duty cycle of the pulse voltage or amplitude of the pulse voltage according to the feedback signal, to adjust conduction states of the switch unit 40. For example, if the duty cycle of the pulse voltage is increased, the conduction time of the switch unit 40 is longer, and the storage unit 50 can store more energy. If the duty cycle of the pulse voltage is decreased, the conduction time of the switch unit 40 is shorter, and the storage unit 50 stores less energy, therefore the third supply voltage is stabilized.

Figure 2:
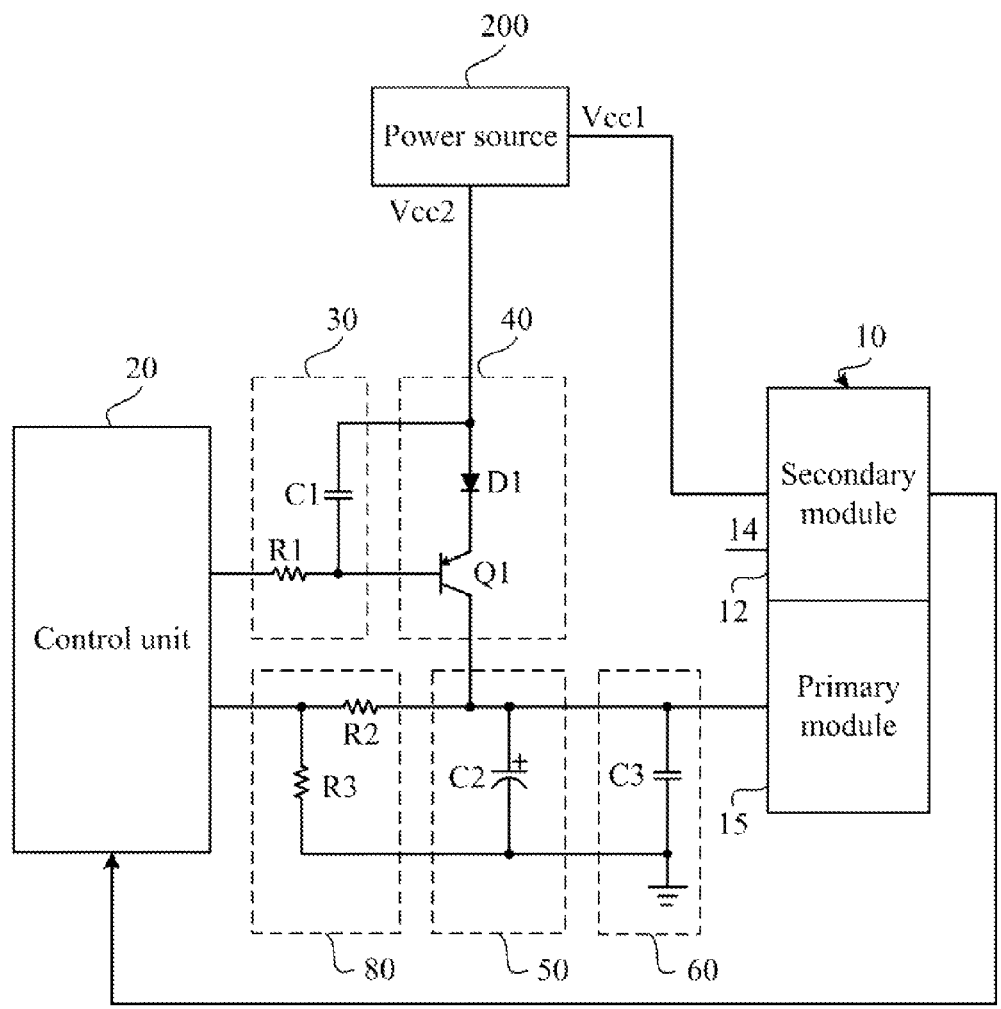
FIG. 2 is a circuit diagram of the electronic device of FIG. 1 in accordance with the one embodiment.

Referring to FIG. 2, the delay unit 30 includes a first resistor R1 and a first capacitor C1. The switch unit 40 includes a transistor Q1 and a diode D1. One end of the first resistor R1 is connected to the base of the transistor Q1, and the other end of the first resistor R1 is connected to the control unit 20. The emitter of the transistor Q1 is connected to a cathode of the diode D1, an anode of the diode D1 is connected to the power source 200. One end of the first capacitor C1 is connected to the base of the transistor Q1, the other end of the capacitor C1 is connected to the anode of the diode D1. In this embodiment, the transistor Q1 is a pnp type bipolar junction transistor (BJT).

The storage unit 50 includes a second capacitor C2. One end of the second capacitor C2 is connected to the collector of the transistor Q1, and the other end of the second capacitor C2 is grounded.

The filtering unit 60 includes a third capacitor C3, one end of the third capacitor C3 is connected to the collector of the transistor Q1, and the other end of the third capacitor C3 is grounded.

The feedback unit 80 includes a second resistor R2 and a third resistor R3. One end of the second resistor R2 is connected to the collector of the transistor Q1, the other end of the second resistor R2 is connected to the control unit 20. One end of the third resistor R3 is connected between the control unit 20 and the second resistor R2, and the other end of the third resistor R3 is grounded.

The principle of the electronic device 100 is as follows: when the power source 200 starts to provide the second supply voltage Vcc2 to the anode of the diode D1, the transistor Q1 is turned on, after the predetermined time period T=R1×C1, the pulse voltage generated by the control unit 20 is transmitted to the base of the transistor Q1. When the pulse voltage is at a low voltage level, the transistor Q1 is turned on, and the capacitor C2 is charged. When the pulse voltage is at a high voltage level, the transistor Q1 is cut off, and the capacitor C2 discharges, and the third supply voltage is provided to the primary module 15 via the filtering unit 60. Even if the processing unit 10 has mistakenly ended initialization, because the pulse voltage is delayed before being provided to the switch unit 40 for the predetermined time period T, the filtered third supply voltage is also delayed before being provided to the primary module 15 for the predetermined time period T, therefore the primary module 15 is effectively protected. Further, during the predetermined time period, the initialization pin 14 is reactivated, and the processing unit 10 is initialized again, after the processing unit 10 has completed initialization, the primary module 15 can safely receive the filtered third supply voltage, and the processing unit 10 starts to work.

Alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. A protection circuit for protecting a processing unit, the processing unit comprising a primary module, a secondary module, and an initialization pin; the processing unit being initialized when a power source starts to provide a first supply voltage to the secondary module and the initialization pin is activated, and generating a control signal when initialization has been completed; the protection circuit comprising:
    a control unit for generating a pulse voltage in response to the control signal;
    a switch unit being turned on when the pulse voltage is at a first voltage level and being cut off when the pulse voltage is at a second voltage level;
    a storage unit for receiving a second supply voltage from the power source and storing energy when the switch unit is turned on, and releasing energy to generate a third supply voltage when the switch unit is cut off; and
    a delay unit for delaying the pulse voltage for a predetermined time period, the third supply voltage being provided to the primary module, wherein the secondary module detects an initialization time period of the processing unit, compares the initialization time period with a threshold time period, and reactivates the initialization pin when the initialization time period is shorter than the threshold time period.

2. The protection circuit of claim 1, wherein the first voltage level is a low voltage level, the second voltage level is a high voltage level.

3. The protection circuit of claim 1, further comprising a feedback unit connected to the storage unit, wherein the feedback unit is used for sampling the third supply voltage and generating a feedback signal, the control unit adjusts a duty cycle of the pulse voltage or amplitude of the pulse voltage according to the feedback signal.

4. The protection circuit of claim 1, further comprising a filtering unit for filtering the third supply voltage.

5. The protection circuit of claim 1, wherein the switch unit comprises a transistor and a diode, the base of the transistor is connected to the control unit, the collector of the transistor is connected to the storage unit, an anode of the diode is connected to the power source, a cathode of the diode is connected to the emitter of the transistor.

6. The protection circuit of claim 5, wherein the delay unit comprises a first resistor and a first capacitor, one end of the first resistor is connected to the base of the transistor, the other end of the first resistor is connected to the control unit, one end of the first capacitor is connected to the base of the transistor, and the other end of the capacitor is connected to the anode of the diode.

7. The protection circuit of claim 1, wherein the storage unit comprises a second capacitor, one end of the second capacitor receives the second supply voltage, and the other end of the second capacitor is grounded.

8. The protection circuit of claim 4, wherein the filtering unit comprises a third capacitor, one end of the third capacitor receives the third supply voltage, and the other end of the second capacitor is grounded.

9. The protection circuit of claim 3, wherein the feedback unit comprises a second resistor and a third resistor, one end of the second resistor receives the third supply voltage, the other end of the second resistor is connected to the control unit, one end of the third resistor is connected between the control unit and the second resistor, the other end of the third resistor is grounded.

10. An electronic device comprising:
    a processing unit comprising a primary module, a secondary module, and an initialization pin; the processing unit being initialized when a power source starts to provide a first supply voltage to the secondary module and the initialization pin is activated, and generating a control signal when initialization has been completed;
    a control unit for generating a pulse voltage in response to the control signal;
    a switch unit being turned on when the pulse voltage is at a first voltage level and being cut off when the pulse voltage is at a second voltage level;
    a storage unit for receiving a second supply voltage from the power source and storing energy when the switch unit is turned on, and releasing energy to generate a third supply voltage when the switch unit is cut off; and
    a delay unit for delaying the pulse voltage for a predetermined time period, the third supply voltage being provided to the primary module, wherein the secondary module detects an initialization time period of the processing unit, compares the initialization time period with a threshold time period, and reactivates the initialization pin when the initialization time period is shorter than the threshold time period.

11. The electronic device of claim 10, wherein the first voltage level is a low voltage level, the second voltage level is a high voltage level.

12. The electronic device of claim 10, further comprising a feedback unit connected to the storage unit, wherein the feedback unit is used for sampling the third supply voltage and generating a feedback signal, the control unit adjusts a duty cycle of the pulse voltage or amplitude of the pulse voltage according to the feedback signal.

13. The electronic device of claim 10, further comprising a filtering unit for filtering the third supply voltage.

14. The electronic device of claim 10, wherein the switch unit comprises a transistor and a diode, the base of the transistor is connected to the control unit, the collector of the transistor is connected to the storage unit, an anode of the diode is connected to the power source, a cathode of the diode is connected to the emitter of the transistor.

15. The electronic device of claim 14, wherein the delay unit comprises a first resistor and a first capacitor, one end of the first resistor is connected to the base of the transistor, the other end of the first resistor is connected to the control unit, one end of the first capacitor is connected to the base of the transistor, the other end of the capacitor is connected to the anode of the diode.

16. The electronic device of claim 10, wherein the storage unit comprises a second capacitor, one end of the second capacitor receives the second supply voltage, the other end of the second capacitor is grounded.

17. The electronic device of claim 13, wherein the filtering unit comprises a third capacitor, one end of the third capacitor receives the third supply voltage, the other end of the second capacitor is grounded.

18. The electronic device of claim 12, wherein the feedback unit comprises a second resistor and a third resistor, one end of the second resistor receives the third supply voltage, the other end of the second resistor is connected to the control unit, one end of the third resistor is connected between the control unit and the second resistor, the other end of the third resistor is grounded.

19. The electronic device of claim 14, wherein the transistor is a pnp type bipolar junction transistor.

* * * * *